(12) United States Patent
Mizue et al.

(10) Patent No.: US 8,741,431 B2
(45) Date of Patent: Jun. 3, 2014

(54) TITANIUM OXIDE SOL AND PROCESS FOR PRODUCING SAME, ULTRAFINE PARTICULATE TITANIUM OXIDE, PROCESS FOR PRODUCING SAME, AND USES OF SAME

(75) Inventors: Kei Mizue, Toyama (JP); Susumu Kayama, Toyama (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/583,860

(22) PCT Filed: Jun. 24, 2011

(86) PCT No.: PCT/JP2011/064497
§ 371 (c)(1),
(2), (4) Date: Sep. 10, 2012

(87) PCT Pub. No.: WO2012/017752
PCT Pub. Date: Feb. 9, 2012

(65) Prior Publication Data
US 2013/0004771 A1     Jan. 3, 2013

(30) Foreign Application Priority Data
Aug. 2, 2010  (JP) .................................. 2010-173614

(51) Int. Cl.
*B32B 5/16*     (2006.01)
(52) U.S. Cl.
USPC ............ 428/402; 428/403; 428/404; 977/811
(58) Field of Classification Search
USPC .................................. 428/402–407; 977/811
See application file for complete search history.

(56) References Cited

U.S. PATENT DOCUMENTS

| | | | |
|---|---|---|---|
| 6,544,493 B1 * | 4/2003 | Tanaka et al. .................. | 423/613 |
| 6,824,758 B2 * | 11/2004 | Tanaka et al. .................. | 423/613 |
| 6,830,742 B2 * | 12/2004 | Tanaka et al. .................. | 423/613 |
| 7,449,166 B2 * | 11/2008 | Tanaka et al. .................. | 423/610 |
| 7,591,991 B2 * | 9/2009 | Kayama et al. ............... | 423/610 |
| 2007/0237943 A1 | 10/2007 | Wakizaka et al. | |
| 2009/0014062 A1 | 1/2009 | Kayama et al. | |
| 2010/0056365 A1 | 3/2010 | Kawai et al. | |
| 2010/0202956 A1 | 8/2010 | Bogicevic | |

FOREIGN PATENT DOCUMENTS

| | | | |
|---|---|---|---|
| JP | 9-67125 A | | 3/1997 |
| JP | 2004-43304 A | | 2/2004 |
| JP | 2006-083363 | * | 3/2006 |
| JP | 2006-83363 A | | 3/2006 |
| JP | 2006-93037 A | | 4/2006 |
| JP | 2006-179444 | * | 7/2006 |
| JP | 2006-179444 A | | 7/2006 |
| JP | 2006-265094 A | | 10/2006 |
| JP | 2006-335619 A | | 12/2006 |
| JP | 4077495 | * | 2/2008 |
| JP | 4077495 B1 | | 4/2008 |
| JP | 2010-528967 A | | 8/2010 |
| WO | 2006/098175 A1 | | 9/2006 |

* cited by examiner

Primary Examiner — Leszek Kiliman
(74) Attorney, Agent, or Firm — Sughrue Mion, PLLC

(57) ABSTRACT

A liquid phase method for producing titanium oxide sol by hydrolysis of titanium tetrachloride, which includes mixing an aqueous titanium tetrachloride solution into water at a temperature of 80° C. or higher within 60 seconds while maintaining the mixed solution at the temperature and cooling it to less than 60° C. within 15 minutes after the mixing is completed. Also disclosed is a titanium oxide sol obtained by the method, having an average primal particle diameter ($D_{BET}$) of 3 to 8 nm, a cumulative 50% volume particle diameter ($D50_{DLS}$) and $D_{BET}$ have the relationship represented by $D50_{DLS}=k \times D_{BET}$ where k is 1 or more and less than 5, and an anatase content of 70% or more; a particulate titanium oxide obtained by drying the titanium oxide sol; and a production method and application thereof to solar cells, lithium ion battery electrodes and dielectric materials.

16 Claims, No Drawings

TITANIUM OXIDE SOL AND PROCESS FOR PRODUCING SAME, ULTRAFINE PARTICULATE TITANIUM OXIDE, PROCESS FOR PRODUCING SAME, AND USES OF SAME

CROSS REFERENCE TO RELATED APPLICATIONS

This application is a National Stage of International Application No. PCT/JP2011/064497, filed on Jun. 24, 2011, which claims priority from Japanese Patent Application No. 2010-173614, filed on Aug. 2, 2010, the contents of all of which are incorporated herein by reference in their entirety.

TECHNICAL FIELD

The present invention relates to ultrafine particulate titanium oxide which is suitable as a material of the photocatalysts, solar cells, dielectric bodies such as $BaTiOP_3$ and electrodes for lithium (Li) ion batteries such as $Li_4Ti_5O_{12}$, and a method for producing the same. Specifically, the present invention relates to a method for producing titanium oxide sol comprising hydrolyzing titanium tetrachloride by the liquid phase method, anatase-type titanium oxide sol having high dispersivity obtained by the method, ultrafine particulate titanium oxide obtained by drying the titanium oxide sol, and the production method and usage thereof.

BACKGROUND ART

Titanium oxide has a very wide field of industrial application, and is versatile which can be used typically as an additive to cosmetics, ultraviolet screening materials and silicone rubber, and in recent years, in a photocatalyst, solar cells, a material of dielectric bodies and a material of an electrode for Li ion batteries as well. Although it is described as "titanium dioxide" in Japanese Industrial Standards (JIS), it is to be abbreviated as "titanium oxide" in the present description because "titanium oxide" is widely used as a general name.

Recently ultrafine particulate titanium oxide is drawing attention as a material for a high-performance dielectric body and an electrode of Li ion batteries. The range of the diameter of the primary particles of ultrafine particulate titanium oxide is not clearly defined in general. While the term "ultrafine particles" is generally used for fine particles having a diameter of about 100 nm or less, the ultrafine particulate titanium oxide of the present invention is titanium oxide having an average primary particle diameter ($D_{BET}$) of 3 to 8 nm calculated on the basis of the BET specific surface area as described below.

For example, $Li_4Ti_5O_{12}$ as a typical material of the electrode for Li ion batteries is generally obtained by a solid phase reaction between a lithium material and titanium oxide. Specifically, $Li_4Ti_5O_{12}$ is produced by the process of uniformly mixing a lithium material and titanium oxide, the process of drying the mixture and the process of treating the mixture with heat. Lithium hydroxide, lithium oxide, lithium carbonate and the like can be used as a lithium material. Titanium oxide is mixed into water in which a lithium material is dispersed. The titanium oxide to be used is preferably anatase-type titanium oxide or aqueous lithium oxide, which has higher reactivity than rutile-type titanium oxide.

It is critical that the titanium has high dispersivity to fulfill its functions. Since variation in the reactivity and quality of the titanium oxide is determined depending on the mixing state in the above-mentioned solid phase reaction, titanium oxide having a low agglomeration degree and high dispersivity is required. If titanium oxide having low dispersivity is used, the process of deflocculating aggregates is needed, which may require excessive energy for crushing aggregates or cause problems of contamination of an abrasive substance or uneven particle size.

High dispersivity is also required for titanium oxide when it is used as a photocatalyst. Since low dispersivity leads to enhancing opacifying property, it will limit the usefulness of the titanium oxide. In the field of solar cells, titanium oxide having low dispersivity is hard to let light through and therefore the titanium oxide contributing to light absorption is to be limited, reducing the incident photon-to-current (conversion) efficiency.

The methods for producing titanium oxide are to be classified broadly into two kinds: i.e. a liquid phase method of hydrolyzing titanium tetrachloride or titanyl sulfate and a gas phase method of reacting titanium tetrachloride with an oxidation gas such as oxygen and water vapor. Titanium oxide powder having high crystalinity and excellent dispersivity can be obtained by the gas phase method, however, since it is obtained by reaction at a temperature higher than 500° C., particle growth and sintering of particles to each other proceed during the reaction and titanium oxide having a specific surface area of 200 $m^2/g$ or more cannot be obtained efficiently (JP-A-2006-265094 (WO 2006/098175 publication); Patent Document 1). Since titanium oxide obtained by the liquid phase method is generated at a temperature from ordinary temperature to about 300° C. at the highest, particle growth is suppressed and ultrafine titanium oxide particles are easily obtainable.

As a method of obtaining titanium oxide having high dispersivity by the liquid phase method, a method of modifying the surface of titanium oxide with a dispersing agent such as silica, alumina and an organic compound in an effort to maintain the dispersibility of slurry or sol over a long time period has been reported. For example, JP-A-2004-043304 (Patent Document 2) discloses a method of dispersing and stabilizing titanium oxide using at least one member of acids selected from hydroxycarboxylic acids.

Since impurities are to be added to titanium oxide in each of the methods as taught by the above-mentioned patent documents, it may not be suitable depending on the uses. When titanium oxide is used for dielectric materials, solar cells or photocatalysts, if an ingredient having corrosivity such as chlorine exists, it may lead to corrosion or deterioration of the substrate, it is necessary to keep the chlorine content in the titanium oxide as low as possible. Also, it is better to keep the contents of iron (Fe), aluminum (Al), silicon (Si), sulfur (S) and the like as low as possible. Impurities should be rejected as much as possible for the use in a dielectric material and an electrode material since the impurities adversely affect the electrical properties of the materials. When titanium oxide is for use in photocatalysts and solar cells, titanium oxide containing Fe is not suitable for use where transparency is required since Fe in the titanium oxide causes coloring; and titanium oxide having a high content of Al, S and the like causes lattice defect and degrades the performance of the materials.

As discussed above, it has been difficult to obtain anatase-type titanium oxide having high dispersivity and high purity according to the conventional methods.

PRIOR ART

Patent Documents

[Patent Document 1] JP-A-2006-265094 (WO 2006/098175 publication)
[Patent Document 2] JP-A-2004-043304

DISCLOSURE OF THE INVENTION

Problems to be Solved by the Invention

Accordingly, an objective of the present invention is to solve the above-mentioned problems and to provide ultrafine particulate titanium oxide having high dispersivity.

Means to Solve the Problem

As a result of intensive various studies to obtain ultrafine particulate titanium oxide having high dispersivity, the present inventors have found that ultrafine particulate titanium oxide having dramatically higher dispersivity compared to the conventional ones by the liquid phase method.

That is, the present inventors have found that ultrafine particle titanium oxide sol having high dispersivity can be obtained by regulating the temperature and the mixing time of the materials to be subjected to hydrolysis reaction within specific ranges and providing a cooling process in the liquid phase method to obtain titanium oxide sol by the hydrolysis process caused when mixing an aqueous solution of titanium tetrachloride and water, which titanium oxide sol has an anatase content of 70% and preferably 90% or more and an average primal particle diameter ($D_{BET}$) calculated from the BET specific surface area of 3 to 8 nm, wherein the cumulative 50% volume particle diameter ($D50_{DLS}$) measured by the dynamic light scattering method and $D_{BET}$ have the relationship represented by the formula of $D50_{DLS}=k \times D_{BET}$ (in the formula, k is a value of 1 or more and less than 5). The present inventors have succeeded in obtaining ultrafine particulate titanium oxide by drying the thus-obtained titanium oxide sol and have accomplished the present invention.

That is, the present invention relates to the method for producing titanium oxide sol; the titanium oxide sol; the method for producing ultrafine particulate titanium oxide; the ultrafine particulate titanium oxide; and the composition, materials for solar cells, materials of the electrode for lithium ion batteries and the dielectric materials containing the same, as described below.

(1) A method for producing titanium oxide sol, comprising a process of mixing an aqueous titanium tetrachloride solution into water at a temperature of 80° C. or higher within 100 seconds while maintaining the mixed solution at the temperature and cooling it to less than 60° C. within 15 minutes after the mixing is completed in a method for producing titanium oxide sol by the hydrolysis of titanium tetrachloride in the liquid phase method.

(2) The method for producing titanium oxide sol as described in (1) above, comprising a step of mixing an aqueous titanium tetrachloride solution into water at a temperature of 80° C. or higher within 60 seconds while maintaining the mixed solution at the temperature and cooling it to less than 60° C. within 15 minutes after the mixing is completed.

(3) The method for producing titanium oxide sol as described in (1) or (2) above, comprising a dechlorination step of separating titanium oxide and hydrochloric acid generated by the hydrolysis reaction using at least one of the ultrafiltration membrane, reverse osmosis membrane, ion-exchange resin and electrodialysis membrane.

(4) Titanium oxide sol obtained by the method as described in any one of (1) to (3) above having an average primal particle diameter ($D_{BET}$) calculated from the BET specific surface area of 3 to 8 nm, wherein the cumulative 50% volume particle diameter ($D50_{DLS}$) measured by the dynamic light scattering method and $D_{BET}$ have the relationship represented by the following formula (1):

$$D50_{DLS}=k \times D_{BET} \qquad (1)$$

(in the formula, k is a value of 1 or more and less than 5)

(5) The titanium oxide sol as described in (4) above, wherein the anatase-type crystal content is 70% or higher.

(6) The titanium oxide sol as described in (4) or (5) above, wherein the chlorine (Cl) content is 0.1 mass % or less.

(7) The titanium oxide sol as described in any one of (4) to (6) above, wherein each content of carbon (C), sulfur (S), aluminum (Al), silicon (Si) and iron (Fe) is 0.01 mass % or less.

(8) A method for producing ultrafine particulate titanium oxide, comprising drying the titanium oxide sol obtained by the method described in any one of (1) to (3) above or the titanium oxide sol described in any one of (4) to (7) above.

(9) Ultrafine particulate titanium oxide obtained by the method described in (8) above.

(10) A composition containing the titanium oxide described in (9) above.

(11) A material for solar cells containing the titanium oxide described in (9) above.

(12) A material for the electrode in lithium ion batteries containing the titanium oxide described in (9) above.

(13) A dielectric material containing the titanium oxide described in (9) above.

Effects of The Invention

By a liquid phase method, the present invention can provide an anatase-type ultrafine particulate titanium oxide having a higher specific surface area compared to the conventional titanium oxide and having excellent dispersivity; and a method for producing the same.

The ultrafine particulate titanium oxide according to the present invention is suitable for use in the photocatalyst, solar cell, dielectric material, material for the electrode of lithium ion batteries, and the like without requiring specific pulverizing treatment or dispersing agent and has a great value industrially.

EMBODIMENT TO CARRY OUT THE INVENTION

The ultrafine particulate titanium oxide having high dispersivity of the present invention has an average primal particle diameter ($D_{BET}$) calculated from the BET specific surface area of 3 to 8 nm, wherein in formula (1) as below representing the relationship between the cumulative 50% volume particle diameter ($D50_{DLS}$) measured by the dynamic light scattering method and $D_{BET}$, coefficient k is a value of 1 or more and less than 5.

$$D50_{DLS}=k \times D_{BET} \qquad (1)$$

Here, the cumulative 50% volume particle diameter ($D50_{DLS}$) is the diameter of the agglomerate secondary particle, and when the value is closer to that of the primary particle diameter, it shows that the titanium oxide sol has less aggregation of the titanium oxide particles and higher dispersivity.

Hereinafter, the method for measuring the diameter of each of particles is to be described.

The specific surface area S (m²/g) of titanium oxide is measured by the single point BET to thereby calculate the average primary particle diameter ($D_{BET}$) (nm) from formula (2) as below.

$$D_{BET}=6000/(S \times \tau) \quad (2)$$

Here, τ means the density of the titanium oxide (g/cm³). Since the titanium oxide of the present invention mainly comprises anatase-type crystals, it is closely similar to τ=4.

For the measurement of the average particle diameter by the dynamic light scattering method, after adjusting the solid content concentration of the titanium oxide sol to 2 mass % using a dynamic light scattering method Particle Analyzer (ELSZ-2; manufactured by Otsuka Electronics Co., Ltd.), the pH of the sol is adjusted to 3.5 (at 25° C.) with hydrochloric acid with monitoring by a pH meter (D-51; manufactured by HORIBA, Ltd.) and the particle size distribution can be measured to obtain the cumulative 50% volume particle diameter ($D50_{DLS}$) value.

Generally, it is said that the smaller size of the titanium oxide particles makes them easier to aggregate to each other, which makes it difficult to balance the fine particle size and the highly dispersed state. The reason for this is that as the particles have a smaller size, the particles have a higher specific surface area, which leads to increase in the surface energy per mass unit and in the cohesive power between each other of the particles. Despite that the titanium oxide of the present invention is in the ultrafine particle state, it has high dispersivity and less aggregation. As the coefficient k in formula (1) which represents dispersivity is the nearer to 1, the titanium oxide has higher dispersivity. One can see that the titanium oxide sol of the present invention in which k is 1 or more and less than 5 has better dispersivity compared to the titanium oxide in Comparative Examples 1 to 4 (in which k is 5 or more) as described later.

Specifically, in the titanium oxide sol of the present invention, an average primal particle diameter ($D_{BET}$) calculated from the BET specific surface area is preferably 3 to 8 nm, more preferably 3.75 to 7.5 nm, and still more preferably 3.75 to 5 nm. While the specific surface area of the titanium oxide sol is as high as 200 m²/g to 400 m²/g, the titanium oxide sol is characterized by very high dispersivity, wherein coefficient k is preferably less than 3, more preferably less than 2 and still more preferably less than 1.5.

The titanium oxide of the present invention mainly comprises the anatase-type crystals suitable for use in a dielectric material and a material of the electrode for the Li ion battery, wherein the anatase content is preferably 70% or more, and more preferably 90% or more. The X-ray diffraction measurement of the powder obtained by drying titanium oxide is carried out and the anatase content is represented by the ratio calculated by the peak height corresponding to the anatase-type crystal (abbreviated as "Ha"), the peak height corresponding to the brookite-type crystal (abbreviated as "Hb") and the peak height corresponding to the rutile-type crystal (abbreviated as "Hr").

Anatase content (%)={Ha/(Ha+Hb+Hr)}×100

The chlorine (Cl) content of the titanium oxide of the present invention is preferably 0.1 mass % or less, more preferably 0.05 mass % or less and the most preferably 0.01 mass % or less. The content of each of carbon (C), sulfur (S), aluminum (Al), silicon (Si) and iron (Fe) is preferably less than 0.1 mass %, more preferably less than 0.05 mass % the most preferably less than 0.002 mass %, respectively. When the titanium oxide is used for a dielectric material and the like, for example, when it is used as a material of barium titanate, it is necessary to strictly control the blending ratio of the barium source and titanium oxide at the time of synthesizing a dielectric body. However, when the impurities contained in titanium oxide increase, it results in a remarkable difference in the composition of barium titanate produced thereof. Also, these impurities not only make a difference in the blending ratio but also have a great effect on the dielectric property.

The production method is to be described below.

The general method for producing titanium oxide by the liquid phase method is a known method. For example, as disclosed in Patent Document 2 (JP-A-2004-43304), ultrafine particulate titanium oxide sol can be obtained by heating an aqueous solution of titanium tetrachloride to 50° C. or more and hydrolyzing it.

In the synthesis of titanium oxide sol by the liquid phase method, first, when an aqueous solution of titanium tetrachloride as a raw material is heated, it causes hydrolysis reaction and titanium hydroxide is generated. The cores of titanium oxide are generated by the polycondensation of titanium hydroxide and grow into primary particles. The crystals generated here are mainly anatase-type and rutile-type ones, and the anatase-type crystals are generated in the initial stage of the reaction and change into the rutile-type as a stabilized phase by the action of HCl.

The method of the present invention comprises a reaction step of hydrolyzing an aqueous solution of titanium tetrachloride and the subsequent cooling step of cooling the reaction liquid. The method of the present invention is characterized in obtaining titanium oxide sol having high dispersivity by controlling the raw material concentration, raw material temperature, mixing time of the raw materials, cooling time and cooling temperature to specific ranges in the above-mentioned reaction step and cooling step.

Specifically, the present invention is characterized in ultrafine particulate titanium oxide having high dispersivity, a low impurity content and a high anatase content by uniformly mixing an aqueous titanium tetrachloride solution at ordinary temperature into water heated to 80° C. or higher within 60 seconds, preferably within a period of not less than one second and not more than 45 seconds and still more preferably within a period of not less than 5 seconds and not more than 30 seconds, while maintaining the mixed solution at the temperature of 80° C. or higher and cooling it to less than 60° C. within 15 minutes after the uniform mixing is completed followed by dechlorination treatment in the liquid phase method for producing titanium oxide sol.

In the method for producing titanium oxide sol of the present invention, the Ti concentration contained in the aqueous solution of titanium tetrachloride to be used is preferably 5 to 25 mass % and more preferably 10 to 20 mass %. When the concentration is less than 5 mass %, titanium hydroxide is precipitated at room temperature, which is not desirable for storage. When the concentration exceeds 25 mass %, it makes aggregated particles more likely and is not desirable.

The temperature of the aqueous solution of titanium tetrachloride in the reaction is not particularly limited, and a solution of 40° C. or less, preferably a solution of 30° C. or less and still more preferably a solution at ordinary temperature is to be used. With respect to the Ti concentration in the reaction solution as a mixture of the aqueous solution of titanium tetrachloride and water preheated to 80° C. or higher, an excessively low concentration reduces productivity and an excessively high concentration lowers the yield due to the decrease in the reactivity. Accordingly, the Ti concentration in the reaction solution is preferably 0.05 to 10 mass % and more preferably 1 to 5 mass %.

Generally, as a method for producing titanium oxide by the hydrolysis of titanium tetrachloride, a method of mixing water and an aqueous solution of titanium tetrachloride and heating the mixed solution to thereby hydrolyzing it has been employed. In this case, the particle core formation proceeds uniformly because titanium tetrachloride has a homogeneous concentration distribution. However, since the hydrolysis depends on the heating rate and heating temperature, the reaction proceeds relatively slowly. Therefore the particles growth is more dominant than the core formation and it is difficult to obtain the particles having a BET specific surface area of 200 $m^2/g$ or higher.

On the other hand, in the present invention, by mixing an aqueous solution of titanium tetrachloride preferably at ordinary temperature (20° C.) into water preheated to 80° C. or higher and maintaining the solution at approximately 80° C. or higher after mixing, white turbidity is observed at the same time with mixing and particles can be obtained immediately after mixing. Since the reaction proceeds rapidly and the number of particle cores to be formed increases, fine particles having a BET specific surface area of 200 $m^2/g$ or higher can be obtained. The preheating temperature of water is preferably not lower than 80° C. and not higher than the boiling point, and more preferably not lower than 90° C. and not higher than the boiling point. If the preheating temperature is lower than 80° C., it slows the progress of the hydrolysis of titanium tetrachloride.

In the present invention, the period for uniformly mixing water and an aqueous solution of titanium tetrachloride (hereinafter referred to as "mixing time") is within 100 seconds, preferably within 60 seconds, more preferably not less than 1 second and not more than 45 seconds, and still more preferably not less than 5 seconds and not more than 30 seconds. The mixing time has an effect on the specific surface area and the shorter mixing time makes it possible to obtain fine particles having a higher specific surface area. In the examples and comparative examples of the present invention, the mixing is carried out under conditions in which the mixture is agitated to a satisfactory extent, and the mixing time comes near to the drop time of the aqueous solution of titanium tetrachloride.

An excessively long mixing time causes time lag in the hydrolysis of the reaction solution and reduces uniformity of the primary particles, which is not desirable.

The stirring apparatus to be used for mixing may be a mixer equipped with rotor wings which is widely used. The shape of the rotor wing may be the usual one such as a propeller-shaped one, a turbine-shaped one, a comb-shaped one and the like. Two or more stirring apparatus or a baffle may be provided in a reaction tank in order to enhance mixing performance. The mixing apparatus is not limited to a batch reactor, and a continuous stirred tank reactor in which a reaction tank is a continuous stirred tank, and while continuously charging titanium chloride and water to the tank, the reaction solution is taken out from the side opposite to the inlet for charging; or a plug flow reactor may also be used.

In the cooling step of the present invention, the time for cooling the reaction solution containing an aqueous titanium tetrachloride solution and water to less than 60° C. after the mixing is completed is preferably 15 minutes or less, more preferably 10 minutes or less, and most preferably 5 minutes or less. If the reaction solution is maintained at 60° C. or higher, the generated primary particles are joined to each other to thereby make secondary particles grow and reduce the dispersivity. By cooling the reaction solution to less than 60° C. right after the formation of the primary particles, the growth of the secondary particles can be inhibited and particles having high dispersivity can be obtained.

The above-mentioned cooling step also has an effect on the forming of rutile-type crystals. The longer the reaction solution is maintained at 60° C. or higher, the more likely the crystals change from the anatase-type to the rutile-type. Generally, the particle surface of the rutile-type crystals is more hydrophobic than that of the anatase-type crystals, and the rutile-type particles are more likely to aggregate to each other to thereby reduce the dispersivity.

The cooling method in the cooling step of the present invention is not particularly limited. A heat-exchanger may be used, or liquid such as cold water and liquid nitrogen may be directly charged into the reactor. In addition, a method of cooling by charging ice and dry ice or a method of cooling by injecting gas such as $N_2$ and air may be employed.

The dechlorination step of the present invention is to remove the hydrochloric acid generated by the hydrolysis of titanium tetrachloride. As a method of separating hydrochloric acid, a method of substituting hydrochloric acid with pure water using an ultrafiltration membrane or reverse osmosis membrane, or a method of deionizing using an electrodialysis membrane or ion-exchange resin may be employed, and a method is preferably one of the above methods or the combination of two or more thereof.

By drying the titanium oxide sol after dechlorination at a temperature of from 50 to 200° C., the ultrafine particulate titanium oxide of the present invention can be obtained.

EXAMPLES

Hereinafter, the present invention will be explained in more detail below with reference to Examples and Comparative Examples, but the present invention is not limited thereto. In Examples and Comparative Examples, each content of chlorine (Cl), carbon (C), sulfur (S), iron (Fe), aluminum (Al) and silicon (Si) was measured by the following methods.

Chlorine (Cl): An aqueous solution of hydrofluoric acid was added to titanium oxide and heated in the microwave to dissolve it, and the obtained solution was measured by potentiometric titration using silver nitrate.

Carbon (C): Heating in the high-frequency induction furnace and infrared absorption method Sulfur (S): Heating in the high-frequency induction furnace and infrared absorption method Iron (Fe): Atomic absorption spectrometry Aluminum (Al) and Si: X-ray fluorescence (XRF) spectrometry Example 1:

690 ml of ion-exchange water was charged into a reaction tank equipped with a comb-shaped agitator and preheated to 95° C. While stirring the water at about 300 rpm and heating the water to maintain it at 95° C., 50 g of the aqueous solution of titanium tetrachloride (Ti concentration: 18 mass %) at room temperature (20° C.) was delivered thereto by drops for 30 seconds to be stirred and mixed in the reaction tank. Since the titanium tetrachloride is uniformly mixed immediately after it was delivered by drops into water, the drop time comes near to the mixing time. The mixed solution was maintained at 95° C. for four minutes after the charging of the titanium tetrachloride. The reaction tank was cooled in an ice bath to 50° C. within less than one minute (it took 40 seconds to cool it to 60° C.). The hydrochloric acid generated by the reaction was removed by an electrodialysis apparatus to thereby obtain titanium oxide sol. After drying by a drier at 100° C., the dried sol was pounded in a mortar to be made into titanium oxide powder. The pH of the obtained titanium oxide sol was adjusted to 3.5 (at 25° C.) and the titanium oxide concentration was regulated to 2 mass %. The adjusted sol was used to measure the average particle diameter $D50_{DLS}$ by the dynamic light scattering method. The titanium oxide powder was used for measuring the BET specific surface area, identifying the crystal type and measuring the contents of chlorine (Cl), carbon (C), sulfur (S), iron (Fe), aluminum (Al) and silicon (Si). The measurement results are shown in Table 1.

Example 2

Titanium oxide was obtained in the same manner as in Example 1 except that titanium tetrachloride was delivered by drops while ion-exchange water was maintained at a preheating temperature of 80° C.

Example 3

Titanium oxide was obtained in the same manner as in Example 1 except that the time for maintaining the mixed solution at 95° C. was set to 10 minutes after the mixing was completed.

Example 4

Titanium oxide was obtained in the same manner as in Example 1 except that an aqueous solution of titanium tetrachloride was delivered by drops to the ion-exchange water in the reaction tank for 60 seconds.

Comparative Example 1

Titanium oxide was obtained in the same manner as in Example 1 except that ion-exchange water was mixed while maintaining a preheating temperature of 70° C.

Comparative Example 2

Titanium oxide was obtained in the same manner as in Example 1 except that the time for maintaining the mixed solution at 95° C. was set to 20 minutes after the mixing was completed.

Comparative Example 3

Titanium oxide was obtained in the same manner as in Example 1 except that titanium tetrachloride was delivered by drops to the ion-exchange water in the reaction tank for 120 seconds.

Comparative Example 4

Titanium oxide was obtained in the same manner as in Example 1 except that the time for cooling the mixed solution from 95° C. to 50° C. was set to 30 minutes (the solution was cooled at a constant rate of 1.5° C./minute and it took 23 minutes to cool the solution to 60° C.)

Comparative Example 5

Titanium oxide was obtained in the same manner as in Example 1 except that the mixed solution was cooled from 95° C. to 70° C. in an ice bath within less than one minute (it took 20 seconds to cool it to 70° C.), maintained at 70° C. for 15 minutes and cooled to 50° C. within less than one minute (it took 15 minutes or more to cool it to 60° C.)

Comparative Example 6

The ultrafine particulate titanium oxide sol STS-01 manufactured by Ishihara Sangyo Kaisha, Ltd. was analyzed. The pH and the titanium oxide concentration of the titanium oxide sol was adjusted to 2.5 (at 25° C.) and 2 mass %, respectively. The thus-adjusted sol was used to measure the average particle diameter $D50_{DLS}$ by the dynamic light scattering method. The titanium oxide powder obtained by drying the titanium oxide sol at 100° C. was used for measuring the BET specific surface area, identifying the crystal type and measuring the contents of chlorine (Cl), carbon (C), sulfur (S), iron (Fe), aluminum (Al) and silicon (Si). The measurement results are shown in Table 1.

TABLE 1

|  |  | Example 1 | Example 2 | Example 3 | Example 4 | Comparative Example 1 | Comparative Example 2 |
|---|---|---|---|---|---|---|---|
| $D50_{DLS}$ | nm | 4.4 | 5.2 | 5.1 | 8.2 | 43.0 | 72.0 |
| $D_{BET}$ | nm | 4.3 | 4.4 | 4.9 | 4.8 | 5.2 | 5.7 |
| $k(D50_{DLS}/D_{BET})$ | — | 1.0 | 1.2 | 1.0 | 1.7 | 8.3 | 12.6 |
| Specific surface area | m²/g | 350 | 344 | 306 | 313 | 291 | 263 |
| Anatase | % | 97 | 97 | 89 | 89 | 80 | 86 |
| Cl | mass % | <0.1 | <0.1 | <0.1 | <0.1 | <0.1 | <0.1 |
| C | mass % | <0.01 | <0.01 | <0.01 | <0.01 | <0.01 | <0.01 |
| S | mass % | <0.001 | <0.001 | <0.001 | <0.001 | <0.001 | <0.001 |
| Fe | mass % | <0.001 | <0.001 | <0.001 | <0.001 | <0.001 | <0.001 |
| Al | mass % | <0.001 | <0.001 | <0.001 | <0.001 | <0.001 | <0.001 |
| Si | mass % | <0.002 | <0.002 | <0.002 | <0.002 | <0.002 | <0.002 |

|  |  | Comparative Example 3 | Comparative Example 4 | Comparative Example 5 | Comparative Example 6 |
|---|---|---|---|---|---|
| $D50_{DLS}$ | nm | 30.2 | 62.1 | 82.7 | 58.0 |
| $D_{BET}$ | nm | 5.0 | 4.9 | 4.7 | 5.2 |
| $k(D50_{DLS}/D_{BET})$ | — | 6.0 | 12.7 | 17.6 | 11.2 |
| Specific surface area | m²/g | 289 | 308 | 322 | 314 |
| Anatase | % | 82 | 98 | 88 | 100 |
| Cl | mass % | <0.1 | <0.1 | <0.1 | <0.1 |
| C | mass % | <0.01 | <0.01 | <0.01 | 0.07 |
| S | mass % | <0.001 | <0.001 | <0.001 | 0.03 |

TABLE 1-continued

| | | | | | |
|---|---|---|---|---|---|
| Fe | mass % | <0.001 | <0.001 | <0.001 | 0.001 |
| Al | mass % | <0.001 | <0.001 | <0.001 | 0.003 |
| Si | mass % | <0.002 | <0.002 | <0.002 | 0.005 |

The invention claimed is:

1. A method for producing titanium oxide sol, comprising a process of mixing to completion an aqueous titanium tetrachloride solution into water at a temperature of 80° C. or higher within 100 seconds while maintaining the mixed solution at the temperature and cooling it to less than 60° C. within 15 minutes after the mixing is completed in a method for producing titanium oxide sol by the hydrolysis of titanium tetrachloride in the liquid phase method.

2. The method for producing titanium oxide sol as claimed in claim 1, comprising a step of mixing an aqueous titanium tetrachloride solution into water at a temperature of 80° C. or higher within 60 seconds while maintaining the mixed solution at the temperature and cooling it to less than 60° C. within 15 minutes after the mixing is completed.

3. The method for producing titanium oxide sol as claimed in claim 1, comprising a dechlorination step of separating titanium oxide and hydrochloric acid generated by the hydrolysis reaction using at least one of the ultrafiltration membrane, reverse osmosis membrane, ion-exchange resin and electrodialysis membrane.

4. Titanium oxide sol obtained by the method as claimed in claim 1 having an average primal particle diameter ($D_{BET}$) calculated from the BET specific surface area of 3.75 to 5 nm, wherein the cumulative 50% volume particle diameter ($D50_{DLS}$) measured by the dynamic light scattering method and $D_{BET}$ have the relationship represented by the following formula (1):

$$D50_{DLS} = k \times D_{BET} \qquad (1)$$

(in the formula, k is a value of 1 or more and less than 5).

5. The titanium oxide sol as claimed in claim 4, wherein the anatase-type crystal content is 70% or higher.

6. The titanium oxide sol as claimed in claim 4, wherein the chlorine (Cl) content is 0.1 mass % or less.

7. The titanium oxide sol as claimed in claim 4, wherein each content of carbon (C), sulfur (S), aluminum (Al), silicon (Si) and iron (Fe) is 0.01 mass % or less.

8. A method for producing ultrafine particulate titanium oxide, comprising drying the titanium oxide sol obtained by the method claimed in claim 1.

9. Ultrafine particulate titanium oxide obtained by the method claimed in claim 8.

10. A composition containing the titanium oxide claimed in claim 9.

11. A material for solar cells containing the titanium oxide claimed in claim 9.

12. A material for the electrode in lithium ion batteries containing the titanium oxide claimed in claim 9.

13. A dielectric material containing the titanium oxide claimed in claim 9.

14. The titanium oxide sol as claimed in claim 4, wherein k is a value of 1 or more and less than 1.5.

15. The method for producing titanium oxide sol as claimed in claim 1, which comprises mixing to completion an aqueous titanium tetrachloride solution into water at a temperature of 80° C. or higher within 30 seconds while maintaining the mixed solution at the temperature and cooling it to less than 60° C. within 15 minutes after the mixing is completed.

16. The method for producing titanium oxide sol as claimed in claim 1, which comprises mixing to completion an aqueous titanium tetrachloride solution into water at a temperature of 80° C. or higher within not less than 5 seconds and not more than 30 seconds while maintaining the mixed solution at the temperature and cooling it to less than 60° C. within 15 minutes after the mixing is completed.

* * * * *